Sept. 9, 1952  C. E. CREDE  2,610,016
VIBRATION ISOLATOR
Filed May 19, 1948

Charles E. Crede
Inventor

Patented Sept. 9, 1952

2,610,016

UNITED STATES PATENT OFFICE 2,610,016

VIBRATION ISOLATOR

Charles E. Crede, Winchester, Mass., assignor to The Barry Corporation, a corporation of Massachusetts Application May 19, 1948, Serial No. 27,921

7 Claims. (Cl. 248—358)

My invention relates to means for mounting delicate equipment, particularly in airplanes, to isolate such equipment from any vibration which may exist at the supporting structure. Vibration isolators, in general, are well known and may be described briefly as a resilient means for supporting the equipment. It may be determined from the theory of vibration isolation that is required that the natural frequency of the equipment upon the isolators must be substantially lower than the frequency of the vibration which is to be isolated.

An equipment mounted upon resilient mounts has a natural frequency, and the motion of the equipment may become excessively large at resonance; i. e., when the vibration to be isolated occurs at the natural frequency of the equipment upon the isolators. It is an object of my invention, therefore, to provide a vibration isolator with a large damping capacity in order to prevent excessive excursion of the mounted equipment when operating at or near its resonant frequency.

Another object of my invention is to provide a vibration isolator whose natural frequency remains constant independently of the load applied to the isolator. This is advantageous when the weight or weight distribution of the mounted equipment has not been accurately predetermined or when it varies from time to time.

A further object of my invention is to provide a vibration isolator which will remain operative at extremely high and low temperatures. This requires the use of a resilient load-supporting element which remains operative throughout a wide temperature range and damping means which provides adequate damping at all temperatures.

Another object of my invention is to provide an isolator which has sufficient lateral flexibility to enable it to be used as a mounting means located underneath the mounted equipment. As will be hereinafter pointed out in detail, proper control of natural frequencies and therefore of isolation effectiveness requires that a vibration isolator located underneath the mounted equipment have a relatively low stiffness in a lateral or horizontal direction.

A further object of my invention is to utilize a combination of metal spring and rubber to isolate vibration of both low and high frequency. A metal spring is capable of attaining the large deflection necessary to isolate vibration of low frequency but occasionally will transmit or amplify vibration of high frequency. I provide a rubber member in series with the metal spring to prevent the transmission of high-frequency vibration.

Other objects and advantages of my invention will become apparent from the following detailed description and accompanying drawings in which.

Figure 1:
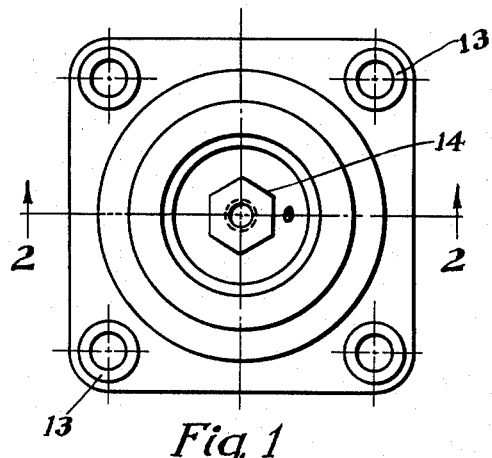
Figure 1 is a plan view of the isolator.
Figure 2:
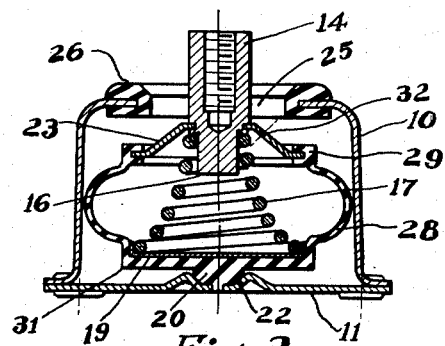
Figure 2 is a section on line 2—2 of Figure 1.

As illustrated in Figures 1 and 2, the isolator includes an outer retaining cup 10 and a base plate 11 secured together by eyelets 13 located at each of four corners. The isolator is attached to a supporting structure by means of screws or bolts inserted through the holes in the eyelets 13. The supported equipment is attached to the upper end of the tapped central core 14. The core 14 includes at its lower end a pilot 16 which nests in the upper end of a substantially conical load-carrying spring 17. The spring 17 rests upon a rigid base 19 which, in turn, is supported by a rubber column 20 which nests in a depression 22 in the center of the base plate 11. The function of this column will be described below. The central core 14 also has rigidly secured thereto a dome-shaped washer 23. This washer 23 is larger than the opening 25 in the top of the outer retaining cup 10 in order to positively prevent escape of the mounted equipment. The opening 25 in the outer retaining cup is encircled by a rubber grommet 26 to provide a cushioned bumper which is effective to limit movement of the central core 14 in all directions.

The spring 17 and spring base 19 are contained within an enclosure formed in part by a thin-walled, sphere-like member 28 made of rubber or other resilient material. A boot 29 which extends around the periphery of the opening in the upper part of the rubber member 28 encases the periphery of the washer 23 and froms an air-tight seal therewith. The bottom wall 31 of the rubber member 28 underlies the spring base 19 and has integral therewith the rubber spring-supporting column 20. An aperture 32 is provided in the washer 23 and constitutes the only opening to the enclosure. As the central core 14 is deflected downwardly, the spring 17 is compressed and the volume within the enclosure is decreased. This causes air to be expelled from the enclosure through the aperture 32. The energy applied to the spring 17 during deflection is stored and returned upon expansion of the spring. The energy required to expel the air from the enclosure becomes lost, however, and thereby limits the amplitude of vibration at resonance.

The natural frequency of a body supported by a resilient element depends upon the relation of the spring stiffness to the mass of the supported body. It is desirable to maintain this natural frequency constant independently of the load in cases where it changes from time to time. The spring, as illustrated in the accompanying drawing, is substantially conical although it should be recognized that a helical spring, a volute spring, or many other types of spring are equally suitable for carrying out the invention as defined by the appended claims. Certain advantages exist, however, in connection with a conical spring. The deflection of the outer coils in such a spring is greater than of the inner coils because the coil diameter is greater. When the outer coils become inactive, the spring becomes stiffer because it embodies fewer coils of smaller diameter. When the conical spring is compressed, certain of the outer coils bottom and become inactive, thereby causing an increase in the spring stiffness. By adjusting the diameter of the various coils and the helix angle of the spring, it is possible to cause a stiffness increase which is proportional to the load increase; the natural frequency thereby remains constant.

Figure 3:
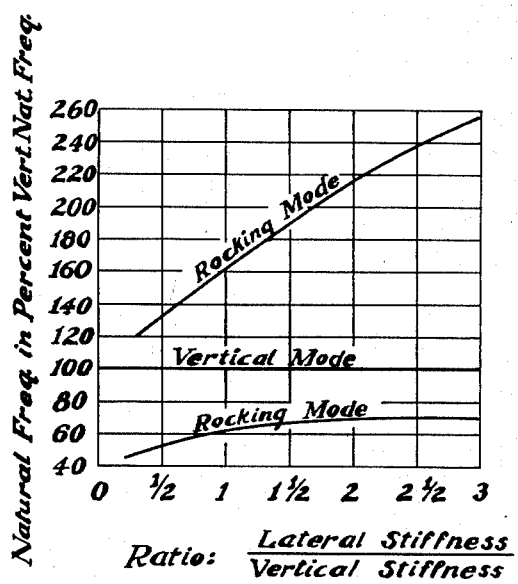
Figure 3 is a set of curves showing the relation between the natural frequencies of a supported equipment in several modes as a function of the stiffness ratio of the isolators.

It is well known that vibration isolation is attained when the natural frequency of the supported body on the resilient elements is substantially less than the frequency of the vibration which is to be isolated. In general, a body supported by resilient elements has several natural frequencies which must all be maintained relatively low if efficient vibration isolation is to be attained. The natural frequencies in various modes are illustrated in Figure 3 for a typical case. It is evident that isolators having high lateral stiffness permit the natural frequency in at least one mode to become excessively high and that relatively low natural frequencies can be attained in all modes only when the ratio of lateral stiffness to vertical stiffness is low. In particular, the lateral stiffness should be substantially less than the vertical stiffness to maintain effective isolation.

Figure 4:
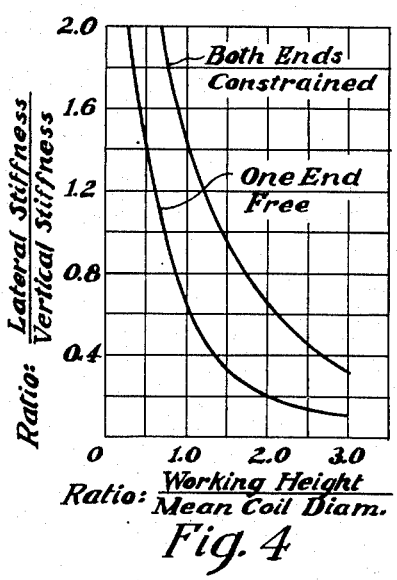
Figure 4 is a set of curves showing the difference between the stiffness ratio for springs having both ends constrained and one end free.

A spring in which both ends are constrained to remain parallel has a relatively high lateral stiffness. This condition is illustrated by the upper curve in Figure 4, and numerical values for the stiffness ratio are given as a function of the ratio of spring height to the coil diameter. These curves apply strictly to a helical spring but generally show the properties of any spring. When one end of the spring is free to rotate, however, the lateral stiffness becomes substantially less than when both ends are constrained to remain parallel. The freedom for one end to rotate is obtained in the isolator as illustrated by the rubber column 20 which supports the spring base 19. The spring base 19 is thus free to tip about a central support, and the conditions tend to be as illustrated by the lower curve in Figure 4. Since this freedom to tip reduces the lateral stiffness and consequently reduces the natural frequencies in the rocking modes, an increased efficiency of vibration isolation is thus attained.

The accompanying drawings illustrate the preferred form of the invention, although it is to be understood that the invention is not limited to the exact details of construction shown and described, as it is obvious that various modifications thereof, within the scope of the claims, will occur to persons skilled in the art.

I claim:

1. In a vibration isolator, a load carrying resilient element, a base for supporting said resilient element, damping means comprising an air space contained within an enclosure made at least partially of resilient material, said enclosure being provided with a relatively small aperture and, means to support said base while permitting tipping thereof.

2. In a vibration isolator, a load carrying resilient element, a base for supporting said resilient element, damping means comprising an air space encompassing said resilient element and contained within an enclosure made at least partially of resilient material, said enclosure being provided with a relatively small aperture and means to support said base comprising a resilient column integral with said enclosure substantially aligned with the normal axis of said resilient element to permit tipping of said base.

3. In a vibration isolator, a load carrying resilient element, a rigid base for supporting said resilient element, damping means comprising an air space contained within an enclosure made of a rubber bellows and a rigid part, said rigid part being provided with a relatively small aperture, and means to support said base comprising a column integral with said bellows arranged to permit tipping of said base.

4. In a vibration isolator, a load carrying resilient element, a base for supporting said resilient element, damping means comprising an air space encompassing said resilient element and contained within an enclosure made of a rubber bellows and a rigid part, said rigid part being provided with a relatively small aperture and means to support said base comprising a column integral with said bellows arranged to permit tipping of said base.

5. In a vibration isolator, a load carrying resilient element made from a metallic wire wound as a downwardly and outwardly increasing spiral, a base for supporting said resilient element underlying at least a portion of said element, damping means comprising an air space encompassing said resilient element and contained within an enclosure made at least partially of resilient material, said enclosure being provided with a relatively small aperture and means to support said base comprising a resilient column integral with said enclosure arranged to permit tipping of said base, said wire being arranged to progressively engage said base to increase the stiffness of said resilient element proportionately to the applied force.

6. In a vibration isolator, a casing, a load carrying resilient element, damping means comprised of an air space contained within an enclosure made at least partially of resilient material and encompassing said resilient element, a relatively small aperture in said enclosure, and means associated with said enclosure arranged to support said resilient element in such a manner as to permit tipping of the lower end of the resilient element.

7. In a vibration isolator, a load carrying resilient element, a base for supporting said resilient element, damping means comprised of an air space encompassing said resilient element and contained within an enclosure made at least partially of resilient material, said enclosure being provided with a relatively small aperture and having a part adapted to resiliently support said base.

CHARLES E. CREDE.

REFERENCES CITED

The following references are of record in the file of this patent:

UNITED STATES PATENTS

| Number | Name | Date |
| --- | --- | --- |
| 1,729,394 | Lee | Sept. 24, 1929 |
| 2,175,405 | Meredith et al. | Oct. 10, 1939 |
| 2,406,601 | Fyler | Aug. 27, 1946 |
| 2,425,565 | Robinson | Aug. 12, 1947 |

FOREIGN PATENTS

| Number | Country | Date |
| --- | --- | --- |
| 157,810 | Germany | Feb. 15, 1938 |
| 541,416 | Germany | Jan. 12, 1932 |